US011606205B2

(12) United States Patent
Stathakopoulou et al.

(10) Patent No.: US 11,606,205 B2
(45) Date of Patent: Mar. 14, 2023

(54) CAUSAL TOTAL ORDER BROADCAST PROTOCOLS USING TRUSTED EXECUTION ENVIRONMENTS

(71) Applicant: International Business Machines Corporation, Armonk, NY (US)

(72) Inventors: Chrysoula Stathakopoulou, Zurich (CH); Signe Katerina Rüsch, Braunschweig (DE); Marcus Brandenburger, Zurich (CH); Marko Vukolić, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/303,478

(22) Filed: May 28, 2021

(65) Prior Publication Data

US 2022/0385454 A1 Dec. 1, 2022

(51) Int. Cl.
*H04L 9/08* (2006.01)
(52) U.S. Cl.
CPC .................................... *H04L 9/088* (2013.01)
(58) Field of Classification Search
CPC ..................................................... H04L 9/088
See application file for complete search history.

(56) References Cited

U.S. PATENT DOCUMENTS

| | | | | |
|---|---|---|---|---|
| 6,671,821 B1* | 12/2003 | Castro | ................. | G06F 11/1482 714/21 |
| 8,230,253 B2 | 7/2012 | Butterworth | | |
| 2002/0129087 A1* | 9/2002 | Cachin | ................. | H04L 63/12 709/200 |
| 2018/0219946 A1 | 8/2018 | Farrahi Moghaddam | | |
| 2019/0020629 A1* | 1/2019 | Baird, III | .............. | H04W 12/02 |
| 2019/0273610 A1* | 9/2019 | Fan | .......... | G06F 7/582 |
| 2020/0074440 A1 | 3/2020 | Fullman | | |
| 2020/0351111 A1* | 11/2020 | Lucco | ................. | H04L 67/10 |
| 2020/0379852 A1* | 12/2020 | Yang | ................. | G06F 11/187 |

(Continued)

OTHER PUBLICATIONS

From Consensus to Atomic Broadcast:Time-Free Byzantine-Resistant Protocols without Signatures, Correia et al. Published Nov. 2005 (Year: 2005).*

(Continued)

*Primary Examiner* — Vu V Tran
(74) *Attorney, Agent, or Firm* — Michael A. Petrocelli

(57) ABSTRACT

A computer executes a causal total order broadcast (CTOB) protocol, in a Byzantine fault-tolerant, distributed computerized system comprising a set of nodes acting as servers for clients of the system. The nodes host a trusted proxy client (TPC) process that executes in a trusted execution environment of the nodes. The TPC process includes for each client request (which include encrypted contents) received from any of the clients, signing the client request. The TPC process invokes a total order broadcast (TOB) protocol to obtain a sequence number for the signed request, whereby the nodes establish a total order in which the signed request is processed by the nodes. Upon determining that the signed request is assigned this sequence number, the TPC process reveals a decrypted version of the encrypted contents of the client request to the set of nodes, and the decrypted version is processed according to the TOB protocol.

21 Claims, 6 Drawing Sheets

(56) References Cited

U.S. PATENT DOCUMENTS

| | | |
|---|---|---|
| 2021/0014042 A1 | 1/2021 | Sivathanu |
| 2021/0073075 A1 | 3/2021 | Zhuo |
| 2022/0058549 A1 | 2/2022 | Cutts |

OTHER PUBLICATIONS

Abid, Muhammad Zeeshan, "A Multi-leader Approach to Byzantine Fault Tolerance", Master of Science Thesis, KTH Royal Institute of Technology, Stockholm, Sweden, Jul. 1, 2015, 115 pages, <http://www.diva-portal.se/smash/get/diva2:838919/FULLTEXT01.pdf>.

Abraham, et al., "Solida: A Blockchain Protocol Based on Reconfigurable Byzantine Consensus", arXiv:1612.02916v2, Nov. 18, 2017, 17 pages.

Aguilera, et al., "Reconfiguring Replicated Atomic Storage: A Tutorial", Bulletin of the EATCS, No. 102, Oct. 2010, pp. 84-108.

Androulaki, et al., "Hyperiedger Fabric: A Distributed Operating System for Permissioned Blockchains", EuroSys 18: Proceedings of the Thirteenth EuroSys Conference, Apr. 2018, Article No. 30, 15 pages, <https://dl.acm.org/doi/10.1145/3190508.3190538>.

Avarikioti, et al., "FnF-BFT: Exploring Performance Limits of BFT Protocols", arXiv:2009.02235v1, Sep. 4, 2020, 15 pages, <https://arxiv.org/pdf/2009.02235.pdf>.

Azouvi, et al., "Winkle: Foiling Long-Range Attacks in Proof-of-Stake Systems", © 2020 Association for Computing Machinery, New-York '20, Oct. 21-23, 2020, New-York, NY, pp. 189-201.

Cachin, et al., "Introduction to Reliable and Secure Distributed Programming", Springer Publishing Company, Feb. 2011, Abstract Only, 1 page, <https://dl.acm.org/doi/book/10.5555/1972495>.

Cachin, et al., "Secure and Efficient Asynchronous Broadcast Protocols", Cryptology ePrint Archive: Report 2001/006, Mar. 7, 2001, 49 pages, <https://eprint.iacr.org/2001/006>.

Castro, et al., "Practical Byzantine Fault Tolerance and Proactive Recovery", ACM Transactions on Computer Systems, vol. 20, No. 4, Nov. 2002, pp. 398-461.

Coelho, et al., "Byzantine Fault-Tolerant Atomic Multicast", 48th Annual IEEE/IFIP International Conference on Dependable Systems and Networks (DSN), 2018, 12 pages, <https://ieeexplore.ieee.org/document/8416469>.

Crain, et al., "DBFT: Efficient Leaderless Byzantine Consensus and its Application to Blockchains", 2018 IEEE 17th International Symposium on Network Computing and Applications (NCA), 8 pages, <https://ieeexplore.ieee.org/document/8548057>.

Deirmentzoglou, et al., "A Survey on Long-Range Attacks for Proof of Stake Protocols", IEEE Access, vol. 7, 2019, pp. 28712-28725, <https://ieeexplore.ieee.org/document/8653269>.

Dolev, et al., "Bounds on information exchange for Byzantine agreement", Journal of the ACM, Jan. 1985, p. 132-140, <https://www.researchgate.net/publication/220431204_Bounds_on_Information_Exchange_for_Byzantine_Agreement>.

Duan, et al., "BChain: Byzantine Replication with High Throughput and Embedded Reconfiguration", UC Davis Previously Published Works, 2014, 16 pages, <https://escholarship.org/uc/item/5ht7n9d4>.

Duan, et al., "BEAT: Asynchronous BFT Made Practical", CCS '18: Proceedings of the 2018 ACM SIGSAC Conference on Computer and Communications Security, Oct. 2018, pp. 2028-2041, <https://dl.acm.org/doi/10.1145/3243734.3243812>.

Duan, et al., "Secure Causal Atomic Broadcast, Revisited", In 47th Annual IEEE/IFIP International Conference on Dependable Systems and Networks, DSN 2017, 12 pages.

Gupta, et al., "RCC: Resilient Concurrent Consensus for High-Throughput Secure Transaction Processing", arXiv:1911 00837v2, Nov. 2, 2020, 13 pages, <https://arxiv.org/abs/1911.00837>.

Kuznetsov, et al., "Asynchronous Reconfiguration with Byzantine Failures", arXiv:2005.13499v2, Aug. 12, 2020, 37 pages, <https://drops.dagstuhl.de/opus/volltexte/2020/13105/>.

Lamport, et al., "The Byzantine generals problem", ACM Transactions on Programming Languages and Systems, Jul. 1982, pp. 382-401, <https://dl.acm.org/doi/10.1145/357172.357176>.

List of IBM Patents or Patent Applications Treated as Related. Filed Herewith. 2 pages.

Liu, et al., "Scalable Byzantine Consensus via Hardware-assisted Secret Sharing", IEEE Transactions on Computers, vol. 68, Issue: 1, Jul. 25, 2018, 15 pages, <https://ieeexplore.ieee.org/document/8419336>.

Madsen, et al., "Transforming Byzantine Faults using a Trusted Execution Environment", 2019 European Dependable Computing Conference (EDCC), pp. 63-70, <https://ieeexplore.ieee.org/abstract/document/8893314>.

Markham, Jerry, "Front-Running'—Insider Trading Under the Commodity Exchange Act", Catholic University Law Review, 1988, vol. 38:69, pp. 69-127.

Mell, et al., "The NIST Definition of Cloud Computing", National Institute of Standards and Technology, Special Publication 800-145, Sep. 2011, 7 pages.

Milosevic, et al., "Bounded Delay in Byzantine Tolerant State Machine Replication", Proceedings of the IEEE Symposium on Reliable Distributed Systems, Sep. 2013, 15 pages.

Moser, et al., "Byzantine-Resistant Total Ordering Algorithms", Information and Computation, vol. 150, Issue 1, Apr. 10, 1999, pp. 75-111, <https://www.sciencedirect.com/science/article/pii/S0890540198927705>.

Pavlovic, et al., "Managing Reconfigurations of Distributed Computing Systems", U.S. Appl. No. 17/303,479, filed May 28, 2021.

Pavlovic, et al., "Scalable Leader-Based Total Order Broadcast Protocol for Distributed Computing Systems", U.S. Appl. No. 17/303,477, filed May 28, 2021.

Poke, et al., "AllConcur: Leaderless Concurrent Atomic Broadcast (Extended Version)", arXiv:1608.05866v2, Apr. 21, 2017, 18 pages, <https://arxiv.org/pdf/1608.05866.pdf>.

Reiter, et al., "How to securely replicate services", ACM Transactions on Programming Languages and Systems (TOPLAS), vol. 16, Issue 3, May 1994, pp. 986-1009, <https://dl.acm.org/doi/10.1145/177492.177745>.

Soriente, et al., "ReplicaTEE: Enabling Seamless Replication of SGX Enclaves in the Cloud", 2019 IEEE European Symposium on Security and Privacy (EuroS&P), pp. 158-171, <https://ieeexplore.ieee.org/document/8806748>.

Spenger, Jonas, "Using Blockchain for Tamper-Proof Broadcast Protocols", Master's Thesis, Humboldt University of Berlin, May 2020, 91 pages, <https://opus4.kobv.de/opus4-zib/frontdoor/index/index/docId/7916>.

Stathakopoulou, et al., "Mir-BFT: High-Throughput BFT for Blockchains", arXiv:1906.05552v2, Sep. 24, 2019, 18 pages, <https://arxiv.org/abs/1906.05552>.

Stathakopoulou, et al., "Mir-BFT: High-Throughput Robust BFT for Decentralized Networks", arXiv: 1906.055523, Jan. 22, 2021, 27 pages, <https://arxiv.org/abs/1906.05552>.

Steffenel, Luiz Angelo, "Fast and Scalable Total Order Broadcast for Wide-area Networks", HAL, 2006, 31 pages, <https://hal.inna.fr/inria-00116895v1/document>.

Steinhoff, Selma, "Secure Dynamic Reconfiguration for Byzantine Fault-Tolerant Distributed Systems", Master Thesis, IBM Research, Zurich, and System Security Group Institute of Information Security, Department of Computer Science, ETH Zurich, Sep. 2, 2020, 50 pages.

Vizier, et al., "ComChain: A blockchain with Byzantine fault-tolerant reconfiguration", Concurrency Computation Practice and Experience, Special Issue Paper, Oct. 23, 2019, 19 pages, <https://onlinelibrary.wiley.com/doi/abs/10.1002/cpe.5494>.

Wang, et al,. "LgTTBFT :Effective Byzantine Fault Tolerance Algorithm Based on Structured Network and Trusted Execution Environment", EasyChair Preprint, No. 1713, Oct. 18, 2019, 15 pages, <https://easychair.org/publications/preprint/8sSP>.

Yadav, et al., "Formal Specifications and Verification of Message Ordering Properties in a Broadcasting System using Event B", University of Southampton, Southampton, United Kingdom, May 2007, 45 pages, <https://www.researchgate.net/publication/39995145_

(56) References Cited

OTHER PUBLICATIONS

Formal_Specifications_and_Verification_of_Message_Ordering_Properties_in_a_Broadcasting_System_using_Event_B>.

Yin, et al., "HotStuff: BFT Consensus with Linearity and Responsiveness", Proceedings of the 2019 ACM Symposium on Principles of Distributed Computing, Jul. 2019, pp. 347-356, <https://www.researchgate.net/publication/334577305_HotStuff_BFT_Consensus_with_Linearity_and_Responsiveness>.

Li, et al., "SAREK: Optimistic Parallel Ordering in Byzantine Fault Tolerance", 2016 12th European Dependable Computing Conference, Sep. 5-9, 2016, pp. 77-88, <https://ieeexplore.ieee.org/document/7780347>.

Sousa, et al., "A Byzantine Fault-Tolerant Ordering Service for the Hyperledger Fabric Blockchain Platform", 2018 48th Annual IEEE/IFIP International Conference on Dependable Systems and Networks, Jun. 25-28, 2018, pp. 51-58, <https://ieeexplore.ieee.org/document/8416470>.

\* cited by examiner

CAUSAL TOTAL ORDER BROADCAST PROTOCOLS USING TRUSTED EXECUTION ENVIRONMENTS

STATEMENT REGARDING FEDERALLY SPONSORED RESEARCH OR DEVELOPMENT

The project leading to this application has received funding from the European Union's Horizon 2020 research and innovation programme under grant agreement No 780477.

BACKGROUND

The invention relates in general to the field of computer-implemented methods, computerized systems, and computer program products for executing causal, total order broadcast (CTOB) protocols in a Byzantine fault-tolerant (BFT), distributed computerized system.

Total order broadcast is a fundamental building block for implementing replication in fault-tolerant distributed systems. BFT is a core concept of distributed ledger systems such as blockchains, which is responsible for maintaining identical replicas of the ledger of requests across all participants. In a distributed setting, TOB guarantees that all nodes establish a total order in which requests will be processed and executed. This is needed to guarantee consistent state replication in state-machine replication (SMR), blockchain, and other distributed ledger systems.

SUMMARY

In an embodiment, a computer executes a causal, total order broadcast (CTOB) protocol, in a Byzantine fault-tolerant, distributed computerized system comprising a set of nodes acting as servers for clients of the system. The nodes host a trusted proxy client (TPC) process that executes in a trusted execution environment of the nodes. The TPC process includes for each client request (which include encrypted contents) received from any of the clients, signing the client request. The TPC process invokes a total order broadcast (TOB) protocol to obtain a sequence number for the signed request, whereby the nodes establish a total order in which the signed request is processed by the nodes. Upon determining that the signed request is assigned this sequence number, the TPC process reveals a decrypted version of the encrypted contents of the client request to the set of nodes, and the decrypted version is processed according to the TOB protocol. According to aspects of the invention, the client request received comprises, in addition to said encrypted contents, a one-time identifier of said each request, and the TPC process further includes identifying a cryptographic key associated with the one-time identifier, via an association and using the identified cryptographic key to decrypt said encrypted contents and obtain said decrypted version. According to aspects of the invention the said association is a current association, said one-time identifier is a non-encrypted one-time identifier of said each request, said each client request received further comprises, in addition to said encrypted contents and the non-encrypted one-time identifier of said each request, an encrypted one-time identifier of a next request, and the TPC process further comprises: using the identified cryptographic key to decrypt said encrypted one-time identifier of the next request, in addition to decrypting said encrypted contents; storing a further association of the decrypted one-time identifier of the next request with a cryptographic key, and deleting the current association. According to aspects of the invention, the identifier is encrypted. According to aspects of the invention, the cryptographic key is a symmetric key that has been used to encrypt said encrypted contents and the encrypted one-time identifier for the next request. According to aspects of the invention, the method further comprises, for each client of the clients, executing a client registration protocol with each TPC process hosted by each of the nodes, so as for said each client to establish the symmetric key and an initial one-time identifier with said each TPC process. According to aspects of the invention, the TPC process further comprises authenticating the client request. According to aspects of the invention, the client request is authenticated using authenticated encryption under the symmetric key. According to aspects of the invention, the TPC process further comprises validating said each client request according to a validation protocol imposed by the computerized system, prior to invoking the TOB protocol to obtain the sequence number for the signed request. According to aspects of the invention, each client request includes an encrypted identifier, and the TPC process further comprises, for said each client request decrypting said encrypted identifier, in addition to decrypting the encrypted contents; and revealing to said each of the nodes, based on the decrypted identifier and upon obtaining said proof, an identity of a client corresponding to said each request, in addition to revealing the decrypted version of the encrypted contents. According to aspects of the invention, obtaining said proof that the signed request is assigned a sequence number comprises obtaining a proof that one of the nodes has delivered the signed request, whereby the signed request is assigned this sequence number. According to aspects of the invention, the proof that the signed request is assigned this sequence number comprises receiving a proof that a sufficient number of nodes have, each, assigned this sequence number as per the TOB protocol; and verifying this proof. According to aspects of the invention, the TPC process further comprises garbage collecting data related to stale clients. According to aspects of the invention, the system is configured to tolerate at most f Byzantine nodes, where f≥1, whereby said sufficient number is at least equal to f+1. According to aspects of the invention, the distributed computerized system comprises n nodes, n≥4, and the system is configured to tolerate at most f Byzantine nodes, where f<n/3. According to aspects of the invention, one or more of the clients are, each, a Byzantine client. According to aspects of the invention, the distributed computerized system implements a blockchain and said each client request includes a blockchain transaction.

In another embodiment, A Byzantine fault-tolerant, distributed computerized system for to executing execute a causal, total order broadcast (CTOB) protocol, or CTOB protocol, the system includes a set of nodes configured to act as servers for clients of the system, wherein each of the nodes is further configured to provide a trusted execution environment and execute a trusted proxy client (TPC) process, or TPC process, in this trusted execution environment, and the TPC process is designed such that, in operation, executing the TPC process causes, for each client request received from any of the clients, the client request comprising encrypted contents, to sign the client request; invoke a total order broadcast (TOB) protocol, or TOB protocol, to obtain a sequence number for the signed request, for the nodes to establish a total order in which the signed request will be processed by the nodes; and upon obtaining a proof determining that the signed request is assigned this sequence number as per the TOB protocol, reveal a decrypted version of the encrypted contents of the client request to said each of the nodes, for the latter to be able to further process it according to the TOB protocol.

A computer program product to execute a trusted proxy client (TPC) process, or TPC process, in a trusted execution environment, to implement a causal, total order broadcast (CTOB) protocol, or CTOB protocol, in a Byzantine fault-tolerant, distributed computerized system comprising a set of nodes configured to act as servers for clients of the system, each of the nodes being further configured to provide such a trusted execution environment and execute such a TPC process in such a trusted execution environment, the computer program product comprising a computer readable storage medium having program instructions embodied therewith, the program instructions executable by processing means of each of one or more of the nodes, so as to cause the processing means to execute such a TPC process in such a trusted execution environment and thereby cause the TPC process, upon execution, to sign the client request; invoke a total order broadcast protocol, or TOB protocol, to obtain a sequence number for the signed request, for the nodes to establish a total order in which the signed request will be processed by the nodes; and upon obtaining a proof that the signed request is assigned this sequence number as per the TOB protocol, reveal a decrypted version of the encrypted contents of the client request to said each of the nodes, for the latter to be able to further process it according to the TOB protocol.

According to a first aspect, the present invention is embodied as a method of executing a causal, total order broadcast protocol (hereafter CTOB protocol) in a Byzantine fault-tolerant (BFT), distributed computerized system comprising a set of nodes acting as servers for clients of the system. Each of the nodes hosts a trusted proxy client process (TPC process), which executes in a trusted execution environment (TEE) of the node. This TPC process causes a node to perform the following steps upon receiving a client request, which is assumed to include encrypted contents. First, the TPC process causes to sign the received client request. Second, it invokes a total order broadcast protocol, or TOB protocol, to obtain a sequence number for the signed request. Invoking the TOB protocol notably causes the nodes to establish a total order in which the signed request will be processed by the nodes. Third, upon obtaining a proof that the signed request is assigned this sequence number (as per the TOB protocol), the TPC process reveals a decrypted version of the encrypted contents of the client request to the node hosting this TPC process, for this node to be able to further process it according to the TOB protocol. The same TPC process executes at each of the node and for each client request received from any of the clients.

In embodiments, each client request comprises a one-time identifier of the request, in addition to encrypted contents. In that case, the TPC process further comprises: identifying a cryptographic key associated with the one-time identifier, via an association; and using the identified cryptographic key to decrypt the encrypted contents of the request and obtain the decrypted version of such contents. The one-time identifier of the request is preferably non-encrypted. Yet, each client request may further comprise an encrypted one-time identifier of a next request (i.e., identifying the next request to be made from that client), in addition to encrypted contents and the non-encrypted one-time identifier of the current request. So, the TPC process may further use the identified cryptographic key to decrypt the encrypted one-time identifier of the next request (in addition to decrypting the encrypted contents of the current request), store a further association (associating the decrypted one-time identifier of the next request with a cryptographic key), and delete the current association (i.e., pertaining to the current request).

According to another aspect, the invention is embodied as a BFT distributed computerized system for executing a CTOB protocol. Consistently with the above method, the system includes a set of nodes configured to act as servers for clients of the system. Each node is further configured to provide a TEE and execute a TPC process in this TEE. As evoked above, the TPC process is designed such that, in operation, executing the TPC process causes, for each client request received from any of the clients, to sign the client request, invoke the TOB protocol, and reveal a decrypted version of the encrypted contents of the client request upon obtaining a proof that the signed request is assigned this sequence number as per the TOB protocol. The system is preferably configured to implement the TEE in software.

According to a final aspect, the invention is embodied as a computer program product for executing a TPC process in a TEE to implement a CTOB protocol in a BFT distributed computerized system as described above. The computer program product includes a computer readable storage medium having program instructions embodied therewith. The program instructions are executable by processing means of each of one or more of the nodes, so as to cause the processing means to execute such a TPC process in such a TEE. This causes the TPC process, upon execution, to sign the client request, invoke the TOB protocol, and reveal a decrypted version of the encrypted contents of the client request upon obtaining a proof that the signed request is assigned this sequence number as per the TOB protocol, consistently with the above method.

In particular, it is directed to methods enabling a fair CTOB protocol, which satisfies causality on top of the total order broadcast (TOB) protocol by leveraging system nodes that host trusted proxy client processes executing in trusted execution environments.

Aspects of the present invention address whether the order of request execution is the same as the order in which requests are submitted, which can be critical for some applications.

Aspects of the present invention address issues related to revealing the content of a request without establishing in advance the order of execution of the request opens a surface for a range of attacks such as to the so-called front running attack.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of a computerized systems and parts thereof, as involved in embodiments. Similar or functionally similar elements in the figures have been allocated the same numeral references, unless otherwise indicated.

Computerized systems, methods, and computer program products, embodying the present invention will now be described, by way of non-limiting examples.

DETAILED DESCRIPTION

Consider the following example of a front running attack for a stock trading service. Assume a distributed service that trades stocks and two clients: Alice and Mallory. Alice issues a request to purchase shares of stock. After discovering the indented purchase, a corrupt node colludes with Mallory to issue a request for the same stock. If Mallory's request is executed first, the demand for the stock increases, inflating the value for the purchase of the stock for Alice's request.

In this example, the invocation of Mallory's request depends on the content of Alice's request. Such a dependency can be referred to as a causal dependency.

With the rise of blockchain systems, as well as digitization in general, opportunities for front-running attacks increase.

Aspects of the present invention prevent front-running attacks, expanding on approaches that use threshold encryption or commit-reveal schemes to add input causality on total order broadcast.

Aspects of the present invention leverage trusted execution environment (TEE) technology, to enhance Byzantine fault-tolerant, total order broadcast protocols with input causality and, preferably, sender obfuscation too. This can be achieved in a modular and efficient way, as now described in detail.

The following description is structured as follows. First, general embodiments and high-level variants are described in section 1. Section 2 describes particularly preferred embodiments, including a detailed description of the flow of FIG. 3. Section 3 concerns technical implementation details. Note, the present method and its variants are collectively referred to as the "present methods". All references Sn refer to methods steps of the diagram and flowchart of FIGS. 2 and 3, respectively, while numeral references pertain to physical parts or components of the system shown in FIG. 1 and the computerized unit shown in FIG. 4.

1. General Embodiments and High-Level Variants

Figure 1:
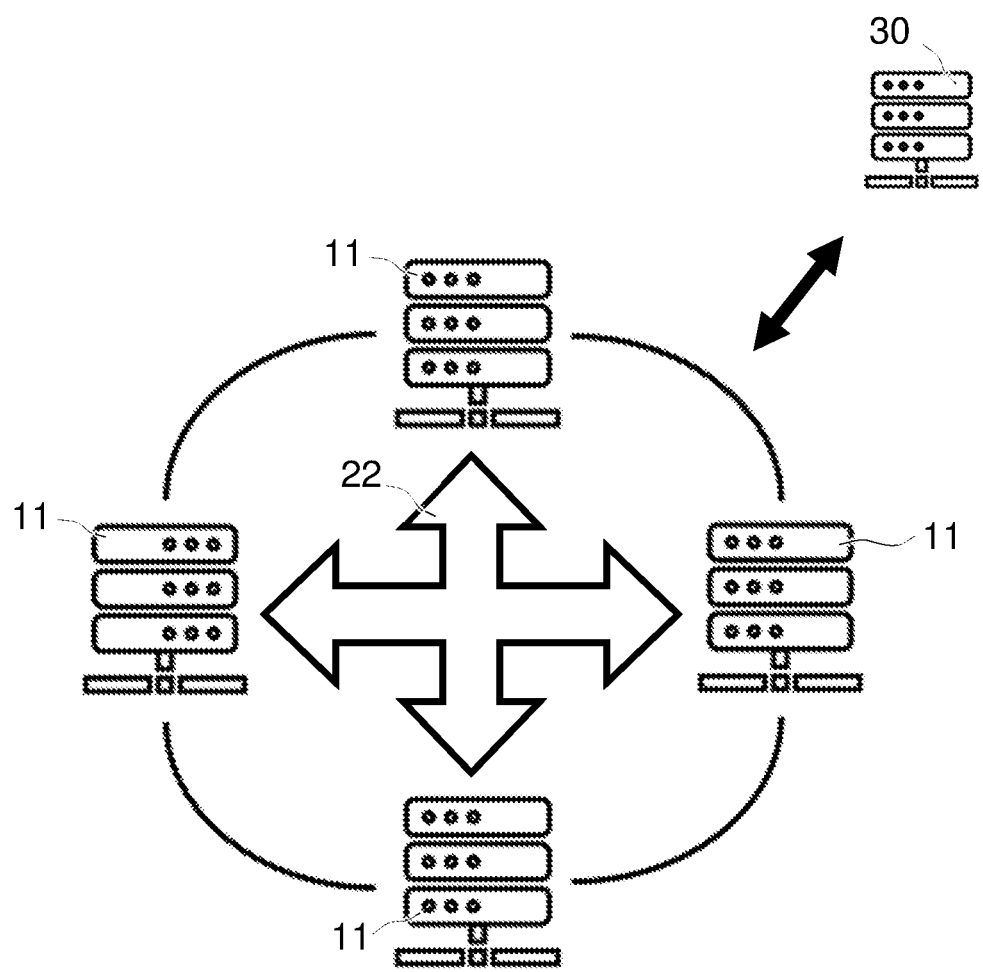
FIG. 1 is a diagram showing a distributed computing system interacting with a client, as in embodiments.
Figure 2:
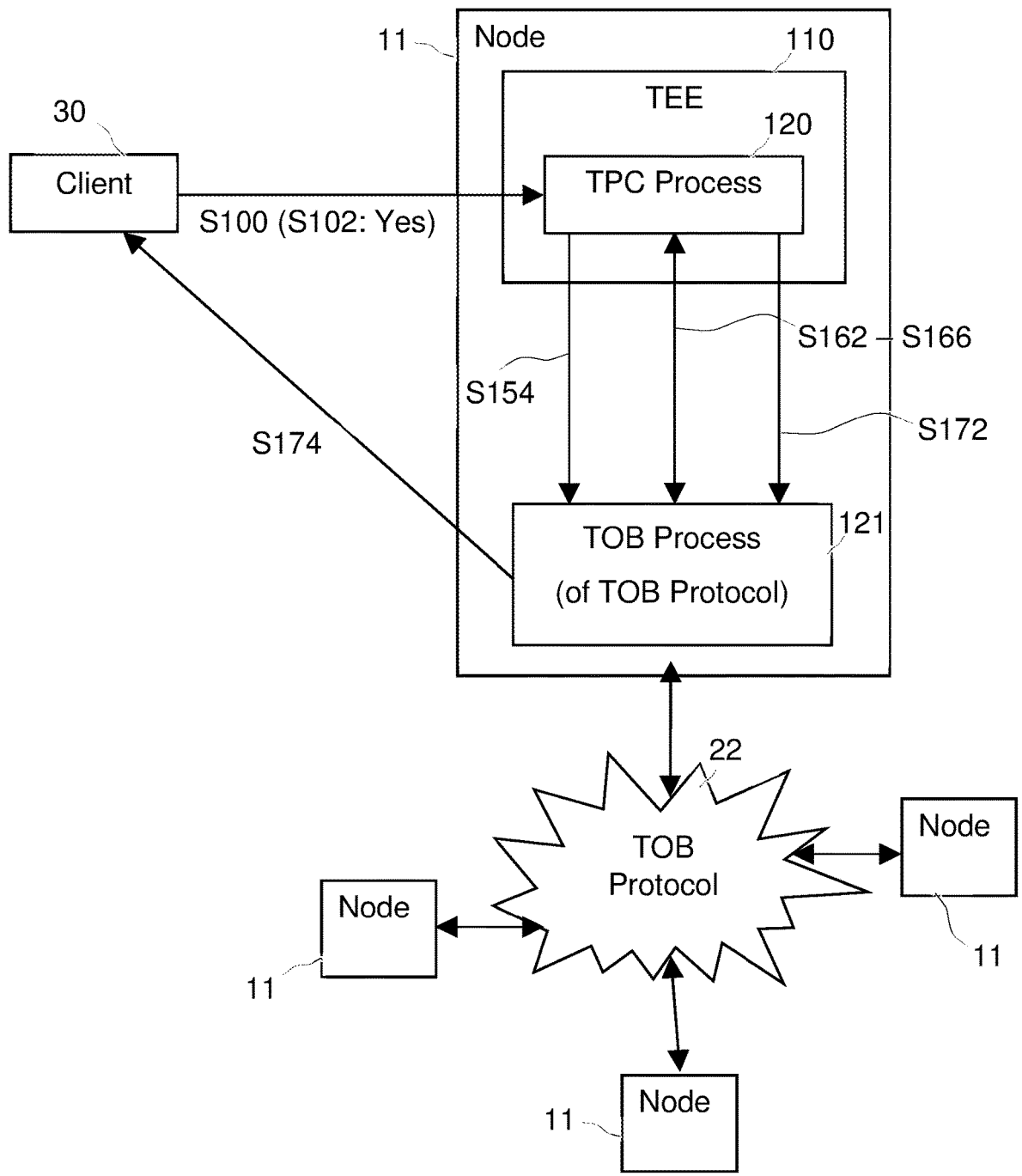
FIG. 2 is a diagram illustrating how a client may interact with a node of a system as shown in FIG. 1 to cause a trusted proxy client process executing in a trusted execution environment of the node to invoke a total order broadcast (TOB) protocol, as involved in embodiments.
Figure 3:
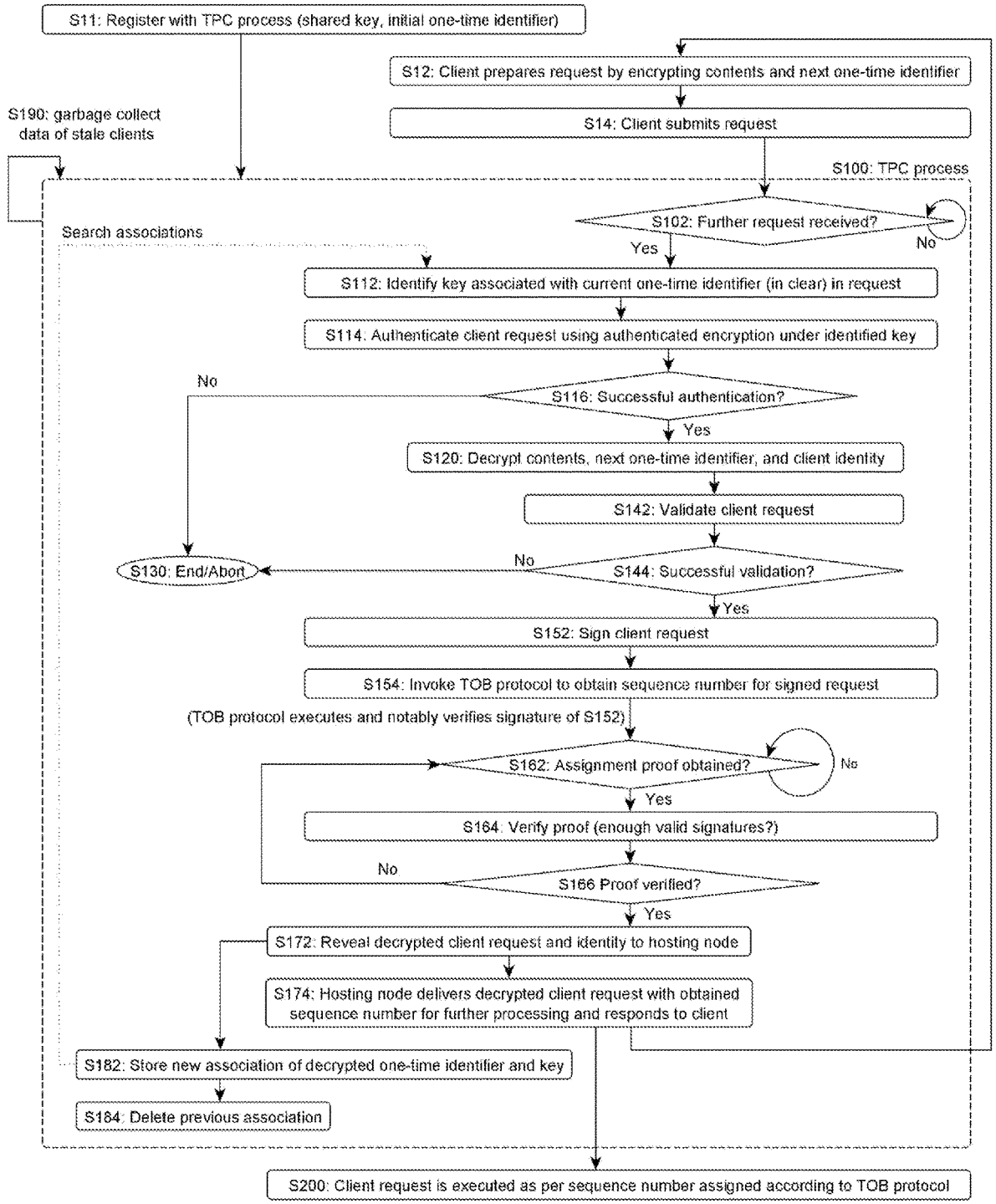
FIG. 3 is a flowchart illustrating high-level steps of a method of executing a causal TOB protocol, according to embodiments.

In reference to FIGS. 1-3, a first aspect of the invention is described, which concerns a method of executing a causal, total order broadcast protocol, or CTOB protocol, in a Byzantine fault-tolerant (BFT) distributed computerized system 1.

As illustrated in FIG. 1, the distributed computing system 1 comprises a network of nodes 11, which adhere to a given consensus protocol 22 of the system 1. The system 1 is distributed and may for example implement a distributed ledger, e.g., a blockchain. The consensus protocol 22 is a total order broadcast (TOB) protocol. The system 1 is enabled by physical machines 11 (nodes) of the network, which runs distributed computing methods, as known per se. The network includes n nodes 11. The distributed system 1 may typically be configured as a permissioned system, which tolerates at most f Byzantine nodes, where $f<n/3$, where $f \geq 1$, such that n must typically be equal to or larger than four, i.e., $n \geq 4$. That is, at most f nodes in the network 1 can be Byzantine (i.e., fail in some way), such that $n \geq 3f+1$. The parameters n and f forms part of the configuration of the system 1, which may possibly be dynamically modified, e.g., by adding or removing nodes. The system 1 of nodes 11 is otherwise configured to process requests of clients, such as client 30 shown in FIG. 1. Only one such client is depicted in FIG. 1, for simplicity. In practice, however, many such clients may potentially interact with the system 1.

Figure 4:
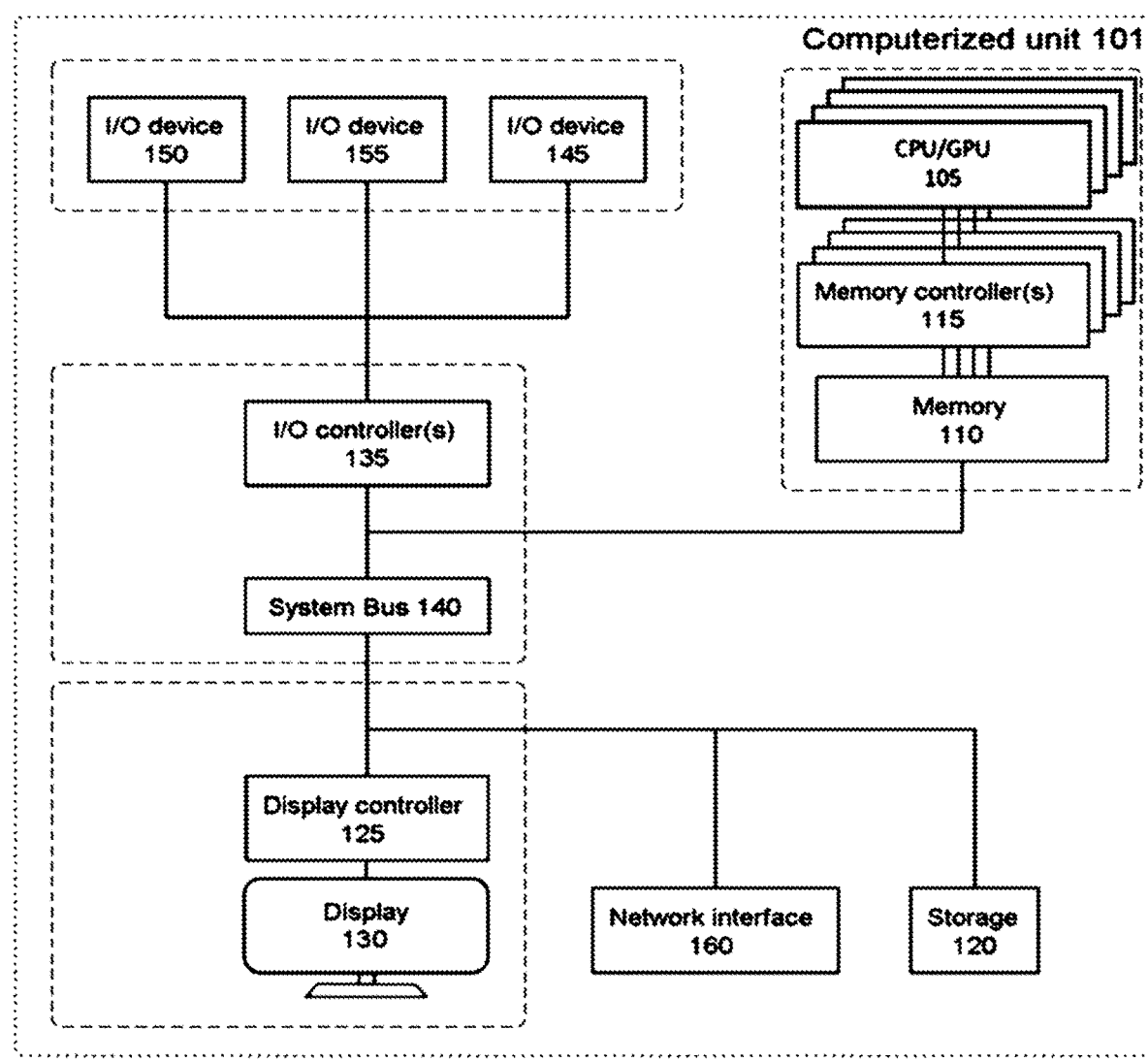
FIG. 4 schematically represents a general-purpose computerized unit, which may be used as a node of a distributed computing system, as in embodiments.

In the present context, each node 11 hosts a trusted proxy client (TPC) process 120, where the TPC process 120 executes in a trusted execution environment (TEE) 110 provided in the node, as schematically depicted in FIG. 2. FIG. 4 shows steps performed by such a TPC process in preferred embodiments; such steps are generally denoted by reference S100 in FIG. 3.

According to aspects of the invention, the TPC process 120 comprises three steps, which are performed for each client request received (step S102: Yes) from any of the clients 30. Such client requests are assumed to include encrypted contents. Assume that a client request is received at a node hosting a given TPC process. This process executes as follows.

First, the TPC process causes to sign S152 the client request received at step S102. By signing the client request, the TPC process 120 creates a new request having the client request encrypted as payload. The TPC signature may integrally form part of the new request or may logically accompany the latter (e.g., be associated therewith, in some way). This signature may notably be used by other TPC processes to verify the request when the request is revealed (after ordering the request), as explained below.

Second, the TPC process invokes (step S154) a TOB protocol to obtain a sequence number for the signed request. As per the TOB protocol invoked, the nodes 11 of the system will establish a total order in which the signed request will be processed by the nodes 11. Note, whereas each node 11 implements a CTOB protocol for any requesting client 30 interacting therewith, the TOB process 121 running on each nodes causes the system of nodes 11 to implement a TOB protocol. In that sense, the nodes 11 act as servers for the clients 30 and can therefore be referred to as servers, or server nodes.

Third, upon obtaining at steps S162-S164 a proof that the signed request is assigned this sequence number (as per the TOB protocol), the TPC process reveals S172 a decrypted version of the encrypted contents of the received client request to the hosting node. From the point on, the normal TOB protocol can be resumed. That is, the hosting node is now able to further process S174 the request (with its decrypted contents) according to the TOB protocol. In particular, decrypted contents of the client request can now be disclosed to other nodes 11 of the system 1.

It is noted that according to aspects of the invention, the nodes 11 may possibly pass the encrypted client request, even before the TPC process invokes the TOB protocol for the signed request. In an embodiment, contents of the client request are encrypted and nodes 11 refrain from immediately disclosing the decrypted contents of the received requests, due to the TPC process. It is noted that the decryption involved in the TPC process can timely occur at any point after having received the request, prior to revealing the decrypted contents of the request to the nodes.

A TEE is an environment to securely execute computer programs by isolating them from the host system. Such isolated environments are also called enclaves. The TEE can for example be embodied as a protected enclave, i.e., a computerized area of restricted access. Such an enclave may, for example, simply consist of one or more private (and preferably encrypted) regions of the memory of a computerized system, e.g., allocated via a set of central processing unit (CPU) instructions. I.e., such instructions allow user-level code to allocate private (and preferably encrypted) regions of memory, which are protected from processes run even at higher privilege levels. The protected enclave may further be configured so as to limit network access through this enclave. More generally, the specific resources of the protected enclave may be designed so as to restrict interactions with external entities or networks. Access may otherwise be restricted via a secure access control means, e.g., including dedicated resources such as internal firewalls, and network admissions control means. Still, this platform may possibly host trusted applications and allow them to interact with external systems, though in a controlled and secure manner Such TEEs may for instance be realized using security-related instruction codes executing on dedicated CPU hardware, e.g., based on Intel Software Guard Extensions (SGX), the IBM zSeries Secure Service Containers (SSC), or other similar technology.

Aspects of the present approach enable a fair causal TOB protocol, which satisfies causality on top of the TOB protocol by leveraging TEEs. For example, as per the present solution, a request r submitted by a client 30 to the CTOB protocol, is encrypted in a way that it can only be decrypted by the TPC process executed in the TEE once r has been delivered. That is, the TPC processes disclose the plaintext content of r to the nodes 11 of the system 1 only after acquiring a proof that the request r is assigned a sequence number sn, such that r will be eventually delivered with sequence number sn by all correct nodes of the system 1. Embodiments of the present method can further address sender obfuscation by encrypting information pertaining to the client's identity until proof of delivery is provided to the TPC processes.

Aspects of the do not require any further communication rounds after TOB protocol is invoked. It noted that aspects of the present invention address issues with threshold cryptography, which is computationally expensive, and thus performs more efficiently. Aspects of the present invention tolerate an arbitrary number of Byzantine clients, while maintaining total order broadcast properties, making it suitable for a range of applications.

All this is now described in detail, in reference to particular embodiments of the invention. The present methods uses request identifiers (IDs) associated with cryptographic keys to adequately handle the client requests. Namely, each client request (as received at step S102) may include, a one-time ID of the request, in addition to encrypted contents. In that case, the TPC process 120 may identify (step S112 in FIG. 3) a cryptographic key associated with the one-time ID, via a suitable association stored in the TEE. Thus, the TPC process may use, at step S120, the identified cryptographic key to decrypt the encrypted contents and obtain a decrypted version of the request.

For example, preferred associations are stored as key-value pairs, where the keys correspond to one-time IDs and the values correspond to cryptographic keys. Such associations are loaded in the TEE and can normally not be loaded outside of the TEE. E.g., the cryptographic key may be identified via a lookup table mapping one-time IDs to cryptographic keys as previously agreed with the client, where the lookup table is maintained in the TEE 110. Such an approach decrypts the contents of the client requests, without it being necessary for the request to communicate information as to the client identity. Note, the request IDs may, in principle, be encrypted, as long as the TPC can access a suitable association mapping the encrypted ID to a suitable key. Such an approach, however, may cause to saturate the (usually limited) memory of the TEE. Therefore, a recurrent scheme is preferably used, which has additional benefit in terms of privacy, as explained below.

Namely, each TEE preferably stores associations for a next request as expected from any client and delete old associations. That is, in embodiments, any incoming request includes a non-encrypted one-time ID of this request, as well as an encrypted one-time ID of a next request, in addition to encrypted contents of the request. In that case, the TPC process 120 may use at (step S120) the cryptographic key as identified at step S112 to decrypt the encrypted one-time ID of the next request, in addition to decrypting other encrypted contents of this request. Finally, the TPC process can delete at step S184 the current association and store, at step S182, a further association, which maps the decrypted one-time ID of the next request to a cryptographic key that is expected to be valid for the next request from that client. Note, this cryptographic key may be the same as the previous key or it may be a new key as included in the current request (encrypted). In both cases, the TPC process 120 will be able to decrypt, in the next request received from that client, encrypted contents and a further encrypted one-time ID for a further request, via the last association saved.

The above approach allows the number of associations maintained at the TEEs to be minimized (e.g., only one key-value pair need be maintained per client). In addition, the TPC process 120 may further run a garbage collection process S190 to remove data related to stale clients 30 (e.g., "old" clients that reconnect to submit a request may be forced to register at step S11 anew).

The encrypted contents and the encrypted one-time ID of the next request are encrypted in such a manner that a same key makes it possible to decrypt both. This recurrent approach allows sensitive contents to be hidden, including, e.g., the client identity, as well as any other ID that may allow the client identity to be revealed. If necessary, the client may rely on some network anonymization technique, to make sure that the client identity cannot be linked to the network identity.

The above recurring scheme allows each TPC process to handle each client request, while allowing the client to maintain client identity beforehand. This way, the TPC process will be able to process the next request, meaning it will be able to decrypt the next encrypted contents and the next encrypted one-time ID for a further request of that client. So, this embodiment promotes causality over the request payload and the whole client request, including the client's identity (referred to as sender obfuscation in this document), thereby increasing security.

According to aspects of the present invention the (initial) cryptographic key and the initial one-time ID can be agreed with the client during an initial registration at step S11. That is, each client may execute, at step S11, a client registration protocol with each TPC process 120 as hosted by each of the nodes 11. This way, each client may agree on a cryptographic key and an initial one-time ID with each TPC process 120.

It is both preferred and efficient to rely on symmetric cryptographic keys i.e., the cryptographic key agreed on at step S11 is preferably a symmetric key, which is subsequently used by a client to encrypt, at step S12, contents of any future request, including the encrypted one-time ID for the next request from that client.

Such a symmetric key can further be used to authenticate the client. That is, the TPC process 120 shall preferably be designed to authenticate, at steps S114-S116, the client request. To that aim, the TPC process may advantageously rely on this symmetric key (i.e., the client request may easily be authenticated, at steps S114-S116, using authenticated encryption under that symmetric key). In such cases, a client submits a request with authenticated encryption under this symmetric key to a TPC process, using the symmetric key it has established at step S11 earlier with this TPC process 120. The symmetric key used for the authenticated encryption can be authenticated by the TPCs during the registration process at step S11 with the client's signature authentication.

Aspects of the TPC process 120 validate, at steps S142-S144, a client request according to a validation protocol imposed by the computerized system 1 and, this, prior to invoking, at step S154, the TOB protocol to obtain the sequence number for the signed request. Note, the validation will typically be application-specific (e.g., the system 1 may implement a blockchain, so that client requests may include blockchain transactions). There, the validation protocol used by the TPC process checks whether a client has enough bitcoins to perform a requested transaction. A request may be validated prior to ordering it, to save computational resources, see FIG. 3, increasing opportunities for request validation.

According to aspects of the invention, client request may preferably comprise an encrypted ID. In that case, the TPC process 120 may further decrypt, at step S120, the encrypted ID, along with other encrypted contents of the request. This way, the TPC process may subsequently reveal, at step S172, the identity of the client to the hosting node 11, using information obtained from the decrypted ID. The identity of the client will typically be revealed (along with other decrypted information) upon the TPC process obtaining, at steps S162-S164, the proof that that the signed request was assigned a sequence number according to the TOB protocol. According to aspects of the invention client identity is a public key associated with the client.

The proof obtained by the TPC process at steps S162-S164 preferably includes, at step S162, a proof that one of the nodes 11 has delivered the signed request, prior to verifying, at step S164, this proof. As per the delivery process, the signed request is assigned a sequence number. Moreover, the TPC process preferably obtains, at step S164, a proof that a sufficient number of nodes 11 have, each, assigned this sequence number as per the TOB protocol. According to aspects of the invention, the system 1 is configured to tolerate at most f Byzantine nodes, which is sufficient to obtain such a proof from f+1 nodes.

Referring now more specifically to FIGS. 1 and 3, another aspect of the invention is described in the following, which concerns a BFT, distributed computerized system 1 for executing a CTOB protocol, in accordance with the present methods. According to aspects of the invention, the system 1 comprises a set of nodes 11 as described earlier in reference to FIGS. 1 and 2. Such nodes are configured to act as servers for clients 30 of the system 1. Each node 11 is further configured to implement a TEE 110 and execute a TPC process 120 in this TEE 110, where the TEE is preferably implemented in software. The TPC process 120 is designed such that, in operation of the system, executing the TPC process causes, for each client request received at any of the nodes 11, to take steps according to the present methods. I.e., a TPC process running at a receiving node causes to sign the client request, invoke the TOB protocol (to obtain a sequence number for the signed request), and reveal a decrypted version of the request upon obtaining a proof of the assignment of the signed request to a sequence number.

In an embodiment, the nodes are configured to allow a TPC process such as described above to be implemented in a TEE. Both the TPC process and the TEE can, for instance, be achieved by loading suitable computerized methods (i.e., computer program code) in the main memory of a node and executing the loaded methods. Each node may for example involve one or more computerized units 101 such as depicted in FIG. 4. Aspects of such computerized units 101 are discussed in detail in section 3.1.

Next, according to a final aspect, the invention can be embodied as a computer program product for executing a TPC process in a TEE, to implement a CTOB protocol in a BFT system such as described above. This computer program product comprises a computer readable storage medium having program instructions embodied therewith. Such program instructions are executable by one or more processors 105, e.g., of computerized units 101 such as depicted in FIG. 4, to implement steps as described above in reference to the present methods. Additional aspects of such computer program products are described in detail in section 3.2.

The above embodiments have been succinctly described in reference to the accompanying drawings and may accommodate a number of variants. Several combinations of the above features may be contemplated. Examples are given in the next section.

2. Particular Embodiments

This section describes embodiments that leverage modern hardware-aided TEE technology, such as SGX, to enhance BFT total order broadcast protocols with input causality and sender obfuscation in a modular and efficient way. Doing so allows applications to run securely in an isolated environment and thereby protect the execution integrity and confidentiality of the application. With additional support for remote attestation, the use of TEEs makes it possible to establish trust in an application executed remotely on a potentially misbehaving host system 11.

Such embodiments rely on a dedicated distributed computing primitive, i.e., an abstraction, which extends TOB with two fairness properties: input causality and sender obfuscation. The CTOB protocol implements this primitive in a modular way on top of the TOB protocol. The CTOB protocol can be built on top of any TOB protocol with external validity. The CTOB protocol preferably uses a TEE on top of the so-called Mir-BFT protocol. Typically, such an implementation results in outperforming state-of-the-art causal TOB in both throughput and latency (by 65% and 50%, respectively), and introduces an overhead of approximately 20% to throughput and 2% to latency with respect to the baseline TOB performance.

In operation, a client first invokes the CTOB protocol with an encryption c of a request r under a symmetric key that the client shares with the TPC processes. This request is referred to as a private request because it also hides the client's identity. In a second phase, the TPC process, upon receiving the private request, decrypts it and verifies its authenticity. In the third phase, the TPC creates a new request $r_{TPC}$ having as payload the private client request and invokes TOB for $r_{TPC}$. In the fourth phase, after some node i delivers $r_{TPC}$ with a proof and a sequence number sn to the TPC process hosted in the same node, the TPC process verifies the proof and discloses (reveals) decrypted contents of the request r to the node. Finally, the hosting node can deliver r with sn and respond to the client. The request r as initially submitted to CTOB is encrypted in a way that it can only be decrypted by the TEE once r has been delivered. That is, the TEEs disclose (the plaintext contents of) r to the nodes of the system only after acquiring a proof that the request is assigned a sequence number sn, such that r will be eventually delivered with sequence number sn by all correct nodes. Sender obfuscation (i.e., hiding the identity of the sender) is guaranteed by encrypting also information pertaining to the client's identity until proof of delivery is provided to the TEEs.

A preferred flow is the following. At step S11, a client registers with TPC processes implemented by the nodes 11, to agree on a shared (symmetric) key and an initial one-time ID. At step S12, the client prepares a request by encrypting useful contents (e.g., related to a transaction) and a next one-time ID (for a next request from that client). The current request otherwise include the one-time ID of the current request, in the clear. At step S14, the client submits the request (as prepared at step S12) to the CTOB protocol, for subsequent processing S100 by a TPC process.

Reference S100 generally refers to steps performed by the TPC process implemented at one node 11, it being understood that similar TPC processes are implemented at other nodes 11 of the system 1, to similarly process client requests. Additionally, the TPC process executing at one node interacts with another node, as shown in FIG. 2.

The TPC process S100 continually checks whether a new request is received (S102: No). If so (S102: Yes), it identifies (step S112) a symmetric key associated with the one-time identifier included (in the clear) in the request received, by searching associations stored in the TEE, in which the TPC is executed. At step S114, the TPC process authenticates the client request using authenticated encryption under the symmetric key identified earlier at step S112. If the authentication fails (S116: No), the request is aborted (step S130). Else, if the authentication is successful (step S116: Yes), the TPC process decrypts (at step S120) contents of the received request, including a requested transaction, the next one-time identifier, and the client identity. Note, steps S114 and S120 may possibly be combined. The TPC process subsequently proceeds (step S142) to validate the client request, as per an application-dependent protocol. If the validation fails (S144: No), the request is refused, step S130. Else (S144: Yes), if the validation is successful, the TPC process signs the initial (encrypted) client request at step S152, whereby the signature is included in the initial encrypted request to form a new request. At step S154, the TPC process invokes the TOB protocol for the new request, in view of obtaining a sequence number. This causes the TOB protocol to execute concurrently at the nodes 11 of the system 1, notably to verify the signature obtained at step S152. Then, the TPC process waits (S162: No) for proof to be obtained (S162: Yes) and proceeds to verify the proof (are there enough valid signatures?) at step S164. If the proof can be verified (step S166: Yes), the host TPC process reveals the decrypted client request and the client identity to the hosting node (step S172), else the process waits until a sufficient number of signatures are obtained (and verified, steps S166-S162-S164). At step S174, the hosting node delivers the decrypted client request with the sequence number obtained for its signed, encrypted counterpart, in view of further processing S200 it, and responds to the client. Next, the TPC process stores a new association of the decrypted one-time identifier and a corresponding cryptographic key (e.g., the same as initially agreed with that client) at step S182 and delete the previous association at step S184. The transaction included in the initial request is executed at step S200, as per the sequence number assigned to it according to the TOB protocol. In the meantime, the TPC process may receive a new request (S102: Yes) as prepared (step S12) and submitted (step S14) by the same client or another client. Concurrently with the steps S100 described above, the TPC may implement a garbage collection scheme S190 to delete old data, e.g., data related to stale clients, including associations pertaining to such clients. This may cause "old" clients to register S11 anew.

3. Technical Implementation Details 3.1 Computerized Units and Systems

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, FIG. 4 schematically represents a computerized unit 101 (e.g., a general- or specific-purpose computer), which may possibly interact with other, similar units 101, to be able to perform steps according to the present methods.

In exemplary embodiments, in terms of hardware architecture, as shown in FIG. 4, each unit 101 includes at least one processor 105, and memory 110 coupled to a memory controller 115. Several processors (CPUs, and/or GPUs) may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media. External (i.e. secondary or auxiliary) storage 120 is normally available, which is not directly accessible by the processing means 105, as usual.

Software in memory 110 may include one or more separate programs, each of which includes executable instructions for implementing logical functions. In the example of FIG. 4, instructions loaded in the memory 110 may include instructions arising from the execution of the computerized methods described herein in accordance with exemplary embodiments. The memory 110 may further load a suitable operating system (OS). The OS essentially controls the execution of other computer programs or instructions and provides scheduling, input-output control, file and data management, memory management, and communication control and related services.

Possibly, a conventional keyboard and mouse can be coupled to the input/output controller 135. Other I/O devices 145, 150, 155 may be included. The computerized unit 101 can further include a display controller 125 coupled to a display 130. Any computerized unit 101 will typically include a network interface or transceiver 160 for coupling to a network, to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wi-Fi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
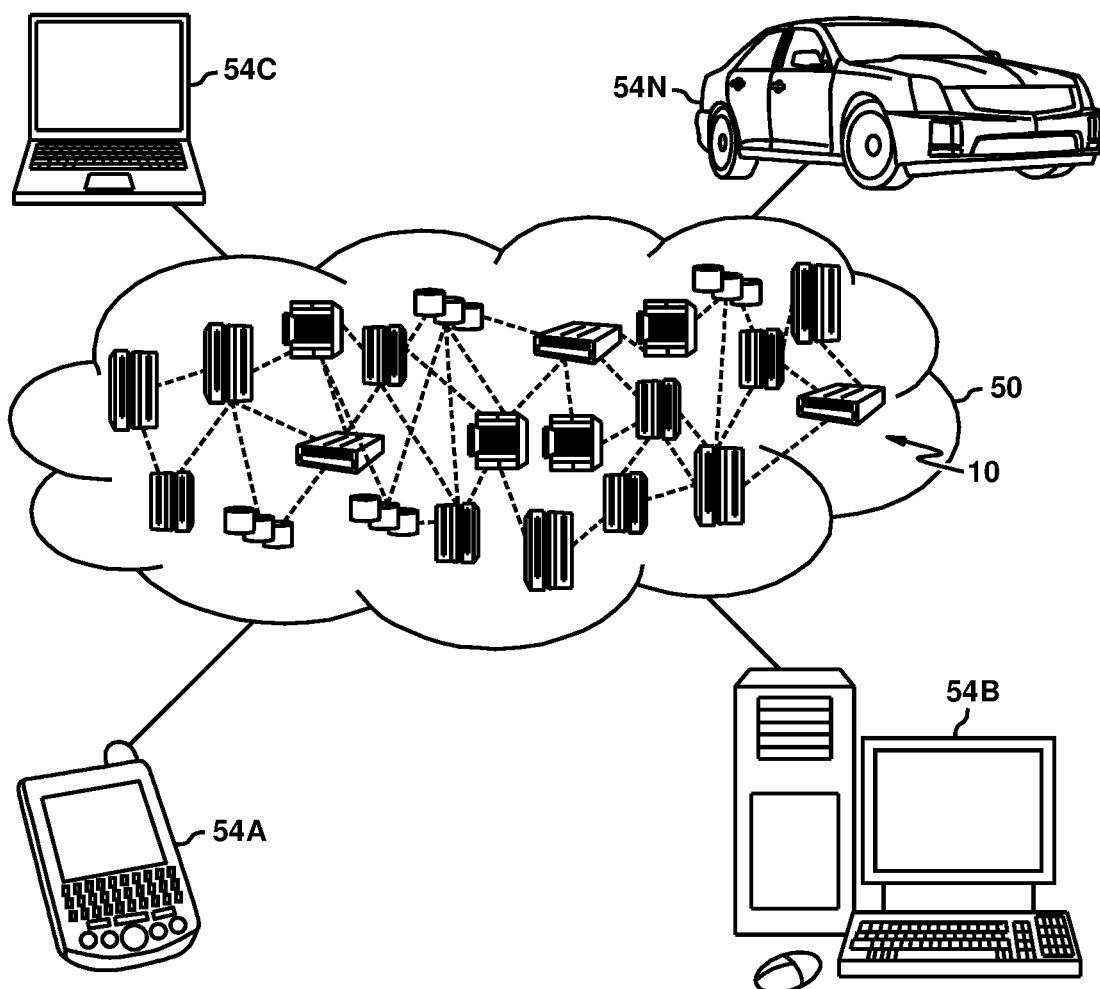
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
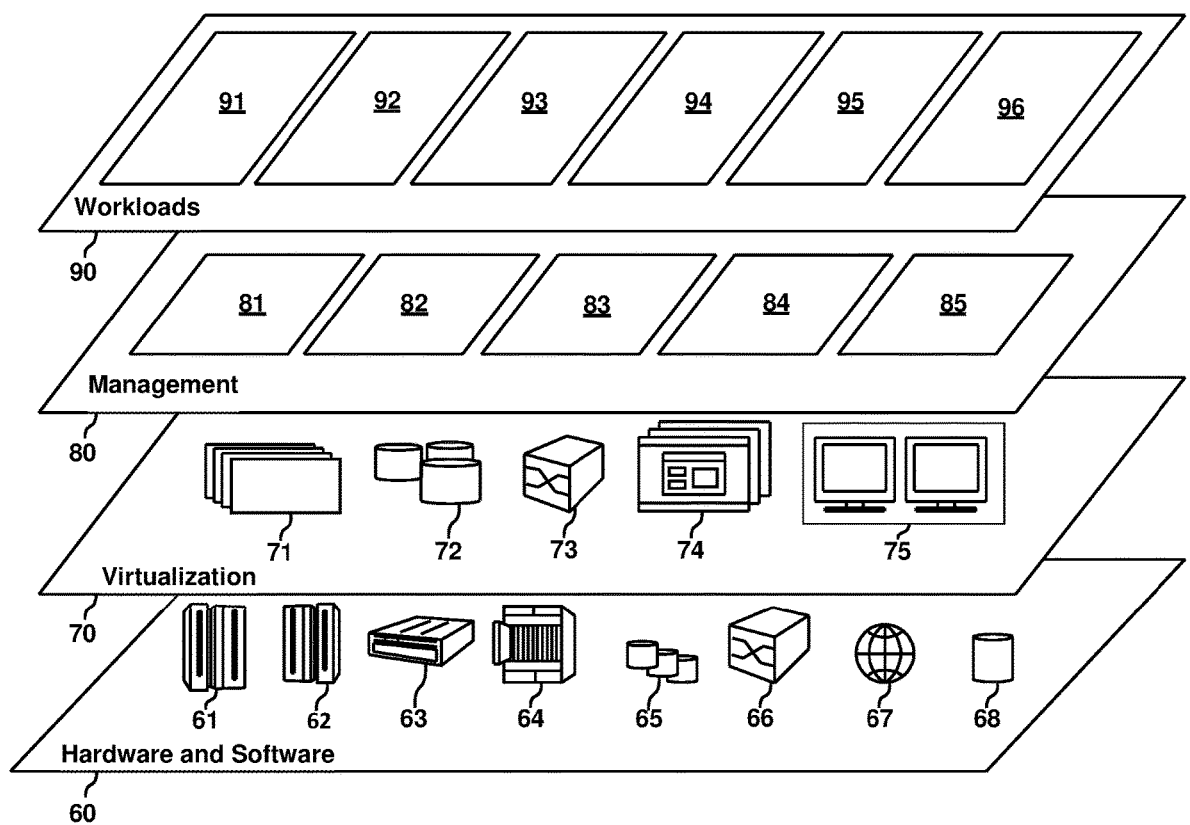
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and causal total order broadcast protocols in Byzantine fault-tolerant distributed computerized systems using trusted execution environments 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of executing a causal total order broadcast (CTOB) protocol, in a Byzantine fault-tolerant, distributed computerized system comprising a set of nodes acting as servers for clients of the system, comprising:
   each of the nodes hosts a trusted proxy client (TPC) process, the trusted proxy client process executing in a trusted execution environment of said set of nodes, and
   the TPC process comprises, for each client request received from any of the clients, the client request comprising encrypted contents:
   signing the client request;
   invoking a total order broadcast (TOB) protocol, to obtain a sequence number for the signed request, whereby the nodes establish a total order in which the signed request will be processed by the nodes; and
   upon determining that the signed request is assigned this sequence number as per the TOB protocol, revealing a decrypted version of the encrypted contents of the client request to said set of nodes, for the latter to be able to further process it according to the TOB protocol;
   wherein said each client request received comprises, in addition to said encrypted contents, a one-time identifier of said each request, and
   the TPC process further comprises:
   identifying a cryptographic key associated with the one-time identifier, via an association;
   using the identified cryptographic key to decrypt said encrypted contents and obtain said decrypted version, wherein said one-time identifier is a non-encrypted one-time identifier of said each request;
   wherein said each client request received further comprises, in addition to said encrypted contents and the non-encrypted one-time identifier of said each request, an encrypted one-time identifier of a next request;
   using the identified cryptographic key to decrypt said encrypted one-time identifier of the next request, in addition to decrypting said encrypted contents; and
   storing a further association of the decrypted one-time identifier of the next request with a cryptographic key.

2. The method according to claim 1, wherein
   said association is a current association,
   deleting the current association, after storing the further association of the decrypted one-time identifier of the next request.

3. The method according to claim 2, wherein
said identifier is encrypted.

4. The method according to claim 2, wherein
said cryptographic key is a symmetric key that has been used to encrypt said encrypted contents and the encrypted one-time identifier for the next request.

5. The method according to claim 4, wherein
the method further comprises, for each client of the clients, executing a client registration protocol with each TPC process hosted by each of the nodes, so as for said each client to establish the symmetric key and an initial one-time identifier with said each TPC process.

6. The method according to claim 4, wherein
the TPC process further comprises authenticating the client request.

7. The method according to claim 6, wherein
the client request is authenticated using authenticated encryption under the symmetric key.

8. The method according to claim 1, wherein
the TPC process further comprises validating said each client request according to a validation protocol imposed by the computerized system, prior to invoking the TOB protocol to obtain the sequence number for the signed request.

9. The method according to claim 1, wherein
said each client request comprises an encrypted identifier, and
the TPC process further comprises, for said each client request:
   decrypting said encrypted identifier, in addition to decrypting the encrypted contents; and
   revealing to said each of the nodes, based on the decrypted identifier and upon obtaining said proof, an identity of a client corresponding to said each request, in addition to revealing the decrypted version of the encrypted contents.

10. The method according to claim 1, wherein
obtaining said proof that the signed request is assigned this sequence number comprises obtaining a proof that one of the nodes has delivered the signed request, whereby the signed request is assigned this sequence number.

11. The method according to claim 1, wherein obtaining said proof that the signed request is assigned this sequence number comprises:
   receiving a proof that a sufficient number of nodes have, each, assigned this sequence number as per the TOB protocol; and
   verifying this proof.

12. The method according to claim 1, wherein
the TPC process further comprises garbage collecting data related to stale clients.

13. The method according to claim 11, wherein
the system is configured to tolerate at most f Byzantine nodes, where f≥1, whereby said sufficient number is at least equal to f+1.

14. The method according to claim 1, wherein
the distributed computerized system comprises n nodes, n≥4, and the system is configured to tolerate at most f Byzantine nodes, where f<n/3.

15. The method according to claim 1, wherein
one or more of the clients are, each, a Byzantine client.

16. The method according to claim 1, wherein
the distributed computerized system implements a blockchain and said each client request includes a blockchain transaction.

17. A Byzantine fault-tolerant, distributed computerized system to execute a causal total order broadcast (CTOB) protocol, the system comprising:
   a set of nodes configured to act as servers for clients of the system, wherein
      each of the nodes is further configured to provide a trusted execution environment and execute a trusted proxy client (TPC) process, in this trusted execution environment, and
      the TPC process is designed such that, in operation, executing the TPC process causes, for each client request received from any of the clients, the client request comprising encrypted contents, to:
         sign the client request;
         invoke a total order broadcast (TOB) protocol, to obtain a sequence number for the signed request, for the nodes to establish a total order in which the signed request will be processed by the nodes; and
         upon determining that the signed request is assigned this sequence number as per the TOB protocol, reveal a decrypted version of the encrypted contents of the client request to said each of the nodes, for the latter to be able to further process it according to the TOB protocol;
   wherein said each client request received comprises, in addition to said encrypted contents, a one-time identifier of said each request, and
   executing the TPC process to:
      identify a cryptographic key associated with the one-time identifier, via an association; and
      use the identified cryptographic key to decrypt said encrypted contents and obtain said decrypted version, wherein said one-time identifier is a non-encrypted one-time identifier of said each request;
   wherein said each client request received further comprises, in addition to said encrypted contents and the non-encrypted one-time identifier of said each request, an encrypted one-time identifier of a next request;
      use the identified cryptographic key to decrypt said encrypted one-time identifier of the next request, in addition to decrypting said encrypted contents; and
      store a further association of the decrypted one-time identifier of the next request with a cryptographic key.

18. The distributed computerized system according to claim 17, wherein
   is configured to implement said trusted execution environment using security-related instruction codes executing on dedicated CPU hardware.

19. A computer program product to execute a trusted proxy client (TPC) process, in a trusted execution environment, to implement a causal total order broadcast (CTOB) protocol, in a Byzantine fault-tolerant, distributed computerized system comprising a set of nodes configured to act as servers for clients of the system, each of the nodes being further configured to provide such a trusted execution environment and execute such a TPC process in such a trusted execution environment, the computer program product comprising a computer readable storage medium having program instructions embodied therewith, the program instructions executable by processing means of each of one or more of the nodes, so as to cause the processing means to execute such a TPC process in such a trusted execution environment and thereby cause the TPC process, upon execution, to:
   sign the client request;

invoke a total order broadcast protocol, or TOB protocol, to obtain a sequence number for the signed request, for the nodes to establish a total order in which the signed request will be processed by the nodes; and upon obtaining a proof that the signed request is assigned this sequence number as per the TOB protocol, reveal a decrypted version of the encrypted contents of the client request to said each of the nodes, for the latter to be able to further process it according to the TOB protocol;

wherein said each client request received comprises, in addition to said encrypted contents, a one-time identifier of said each request, and executing the TPC process to:
  identify a cryptographic key associated with the one-time identifier, via an association; and
  use the identified cryptographic key to decrypt said encrypted contents and obtain said decrypted version, wherein said one-time identifier is a non-encrypted one-time identifier of said each request;
  wherein said each client request received further comprises, in addition to said encrypted contents and the non-encrypted one-time identifier of said each request, an encrypted one-time identifier of a next request;
  use the identified cryptographic key to decrypt said encrypted one-time identifier of the next request, in addition to decrypting said encrypted contents; and
  store a further association of the decrypted one-time identifier of the next request with a cryptographic key.

20. A method of executing a causal total order broadcast (CTOB) protocol, in a Byzantine fault-tolerant, distributed computerized system comprising a set of nodes acting as servers for clients of the system, comprising:

each of the nodes hosts a trusted proxy client (TPC) process, the trusted proxy client process executing in a trusted execution environment of said set of nodes, and the TPC process comprises, for each client request received from any of the clients, the client request comprising encrypted contents:
  signing the client request;
  invoking a total order broadcast (TOB) protocol, to obtain a sequence number for the signed request, whereby the nodes establish a total order in which the signed request will be processed by the nodes; and upon determining that the signed request is assigned this sequence number as per the TOB protocol, revealing a decrypted version of the encrypted contents of the client request to said set of nodes, for the latter to be able to further process it according to the TOB protocol, wherein the TPC process further comprises validating said each client request according to a validation protocol imposed by the computerized system, prior to invoking the TOB protocol to obtain the sequence number for the signed request.

21. A method of executing a causal total order broadcast (CTOB) protocol, in a Byzantine fault-tolerant, distributed computerized system comprising a set of nodes acting as servers for clients of the system, comprising:

each of the nodes hosts a trusted proxy client (TPC) process, the trusted proxy client process executing in a trusted execution environment of said set of nodes, and the TPC process comprises, for each client request received from any of the clients, the client request comprising encrypted contents:
  signing the client request;
  invoking a total order broadcast (TOB) protocol, to obtain a sequence number for the signed request, whereby the nodes establish a total order in which the signed request will be processed by the nodes; and upon determining that the signed request is assigned this sequence number as per the TOB protocol, revealing a decrypted version of the encrypted contents of the client request to said set of nodes, for the latter to be able to further process it according to the TOB protocol, wherein said each client request comprises an encrypted identifier, and the TPC process further comprises, for said each client request:
  decrypting said encrypted identifier, in addition to decrypting the encrypted contents; and
  revealing to said each of the nodes, based on the decrypted identifier and upon obtaining said proof, an identity of a client corresponding to said each request, in addition to revealing the decrypted version of the encrypted contents.

\* \* \* \* \*